United States Patent
Sawashi et al.

(10) Patent No.: US 7,110,737 B2
(45) Date of Patent: Sep. 19, 2006

(54) AUDIO EQUIPMENT AND CONTROL METHOD OF AUDIO EQUIPMENT

(75) Inventors: Tokihiko Sawashi, Tokyo (JP); Toshiaki Kobayashi, Saitama (JP); Koji Kobayashi, Kanagawa (JP)

(73) Assignee: Sony Corporation, (JP)

( * ) Notice: Subject to any disclaimer, the term of this patent is extended or adjusted under 35 U.S.C. 154(b) by 417 days.

(21) Appl. No.: 10/428,184

(22) Filed: Apr. 30, 2003

(65) Prior Publication Data

US 2003/0216132 A1 Nov. 20, 2003

(30) Foreign Application Priority Data

May 14, 2002 (JP) .......................... P2002-138142

(51) Int. Cl.
  *H04B 1/06* (2006.01)
(52) U.S. Cl. .................. 455/245.1; 455/552.1; 455/234.1; 455/232.1
(58) Field of Classification Search ............. 455/552.1, 455/553.1, 232.1, 234.1, 245.1, 234.2, 242.1
See application file for complete search history.

(56) References Cited

U.S. PATENT DOCUMENTS

| 6,084,450 | A | * | 7/2000 | Smith et al. ................. 327/172 |
| 6,148,220 | A | * | 11/2000 | Sharp et al. ................. 455/572 |
| 6,563,377 | B1 | * | 5/2003 | Butler ........................ 330/10 |
| 6,819,912 | B1 | * | 11/2004 | Roeckner et al. ........... 455/296 |

* cited by examiner

*Primary Examiner*—Quochien B. Vuong
*Assistant Examiner*—Christian A. Hannon
(74) *Attorney, Agent, or Firm*—Lerner, David, Littenberg, Krumholz & Mentlik, LLP

(57) ABSTRACT

Audio equipment and a method of controlling audio equipment include a switching power amplifier circuit and a controller controlling a switching frequency of the power amplifier circuit. The controller varies the switching frequency of the power amplifier circuit in accordance with a receiving frequency in a case of receiving at least a medium-wave broadcast wave.

3 Claims, 6 Drawing Sheets

AUDIO EQUIPMENT AND CONTROL METHOD OF AUDIO EQUIPMENT

CROSS REFERENCES TO RELATED APPLICATIONS

The present document is based on Japanese Priority Document JP 2002-138142, filed in the Japanese Patent Office on May 14, 2002, the entire contents of which being incorporated herein by reference.

BACKGROUND OF THE INVENTION

1. Field of the Invention

The present invention relates to audio equipment and a method of controlling audio equipment, in particular, to a system having a switching type power amplifier circuit. According to the present invention, by varying a switching frequency of a power amplifier circuit in accordance with a receiving frequency, a user can surely listen to a desired program in a case where the audio system includes a switching power amplifier circuit.

2. Description of Related Art

In conventional audio equipment, a power amplifier circuit drives a speaker. The power amplifier circuit is sorted into two types: a linear power amplifier in which an input signal is linearly amplified, and a switching power amplifier in which a final transistor is switched in accordance with a pulse width modulation signal generated from an input signal.

In late years, the switching power amplifier circuit (so-called "class D power amplifier circuit) is employed in audio equipment including a car audio system or the like, since it has higher power efficiency and less heat emission compared to the linear power amplifier.

SUMMARY OF THE INVENTION

By the way, the switching power amplifier circuit has a disadvantage of having severe noises due to switching operations using the pulse width modulation signal.

In a class-D power amplifier circuit, a frequency of the switching operation (hereinafter referred to as "switching frequency") is set in a range of several hundreds kHz to several MHz. This brings about spurious in a frequency range of several hundreds kHz to several MHz.

In the audio equipment employing the switching power amplifier circuit, there have been taken such measures for avoiding the spurious as arranging a filter between a speaker and a power amplifier circuit or shielding the whole power amplifier circuit. However, it is not possible to completely avoid such a spurious. Nonetheless, a frequency band of such a switching frequency includes a frequency band of radio broadcast in a medium wave.

Therefore, the audio equipment employing the switching power amplifier circuit have influence on receiving radio broadcast in the medium wave, and the noise due to the spurious makes it significantly difficult to listen to the radio broadcast.

The present invention has been made in view of the above-described problems. The present invention is to provide audio equipment and a method of controlling equipment, capable of surely listening to a desired program even in a case of having a switching power amplifier circuit.

In order to solve the problem, the present invention is applied to audio equipment, control means thereof varies a switching frequency of a power amplifier circuit in accordance with a receiving frequency in a case of receiving at least a broadcasting wave in a medium wave.

In addition, the present invention is applied to a control method of audio equipment amplifying an audio signal using a switching power amplifier circuit, in a case of receiving at least a broadcast wave in a medium wave. In the method, a switching frequency of a power amplifier circuit is varied along with a receiving frequency.

According to the constitution of the present invention applied to audio equipment, it is possible to vary the switching frequency without affecting reception of the broadcast wave and to secure reception the broadcast wave. This makes it possible for a user to surely listen to a desired program even in the case of employing the switching power amplifier circuit.

In addition, according to the method of the present invention, it is possible to provide a control method of audio equipment capable of making a user surely listen to a desired program even in the case of employing the switching power amplifier circuit.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Now, with reference to the attached drawings, embodiments of the present invention will be described.

(1) First Embodiment (1-1) Constitution of the First Embodiment

Figure 2:
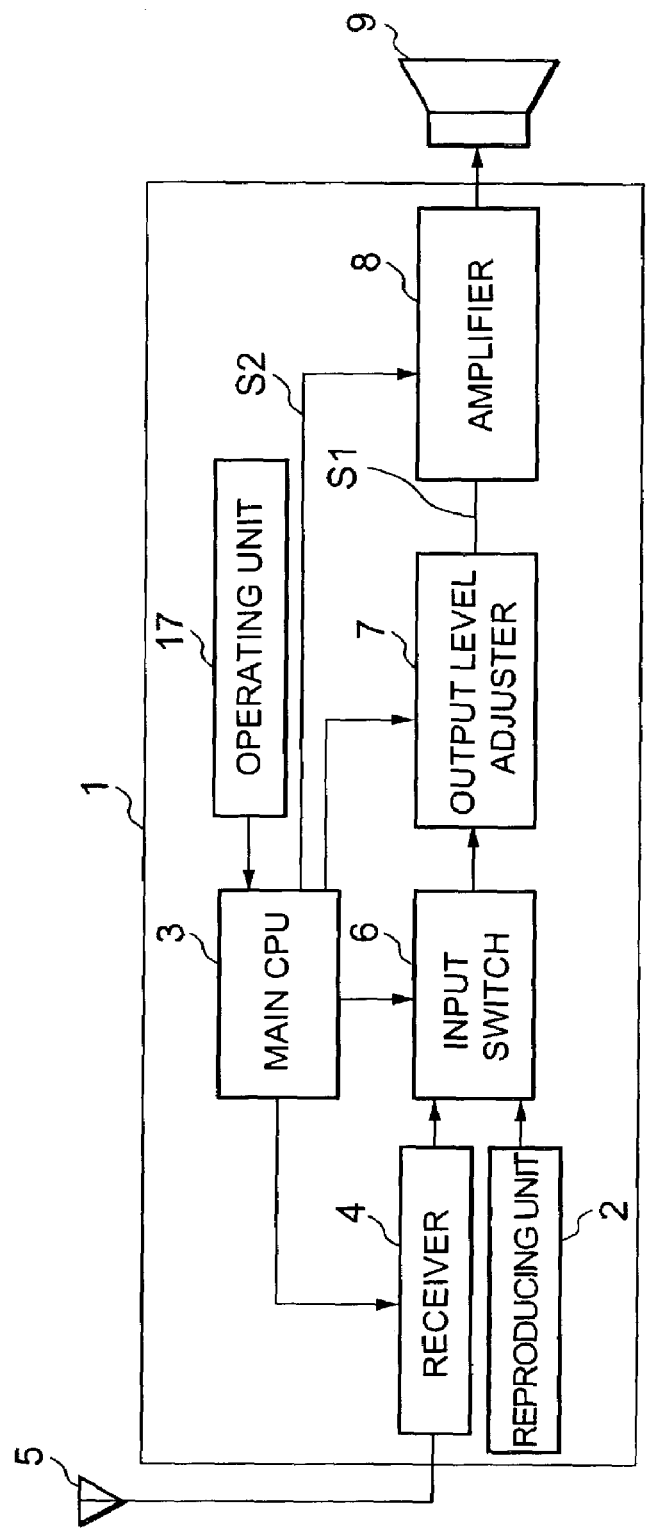
FIG. 2 is a block diagram showing the car audio system according to the first embodiment of the present invention.

FIG. 2 is a block diagram showing a car audio system according to a first embodiment of the present invention. A car audio system 1 is equipment mounted on a movable body such as an automobile. The car audio system 1 provides a user with music provided through various kinds of broadcasting or various kinds of recording media, or the like.

In the car audio equipment 1, a source-reproducing unit 2 reproduces audio data recorded on a recording medium and output an audio signal in the form of a digital signal under control of a main central processing unit (main CPU) 3. Such an audio signal is referred to as a first audio signal in the present specification. Herein, the recording medium includes a hard disk, a memory card, and an optical disc such as a compact disc, a mini disc and DVD. Accordingly, the source-reproducing unit 2 comprises an optical disc device, a hard disk device or the like.

A broadcast receiver unit 4 receives a broadcast program and outputs an audio signal in the form of a digital signal under control of the main CPU 3. Such an audio signal is referred to as a second audio signal in the present specification. The broadcast receiver unit 4 comprises a tuner selecting broadcast waves in the medium-wave broadcasting and FM broadcasting from various broadcast waves obtained through an antenna 5, an intermediate frequency circuit amplifying an intermediate frequency signal output from the tuner, and a detector circuit detecting the intermediate frequency signal output from the intermediate frequency circuit and reproducing the second audio signal. The broadcast receiver unit 4 outputs the second audio signal obtained from the detector circuit.

An input switch unit 6 selects either one of the first audio signal output from the source reproducing unit 2 and the second audio signal output from the broadcast receiver unit 4 and output the selected audio signal, as an audio signal S1, to an output level adjuster unit 7 following thereto under the control of the main CPU 3. The output level adjuster unit 7 corrects volume and sound quality of the audio signal S1 output from the output switch unit 6 under the control of the main CPU 3.

The power amplifier unit 8 is a switching power amplifier circuit. It generates a pulse width modulation signal in accordance with the audio signal S1 output from the output level adjuster unit 7 and switches a final transistor in accordance with the pulse width modulation signal so as to drive a speaker 9. According to the above-mentioned arrangement, the user can listen to his/her desired music using the car audio equipment 1.

Figure 3:
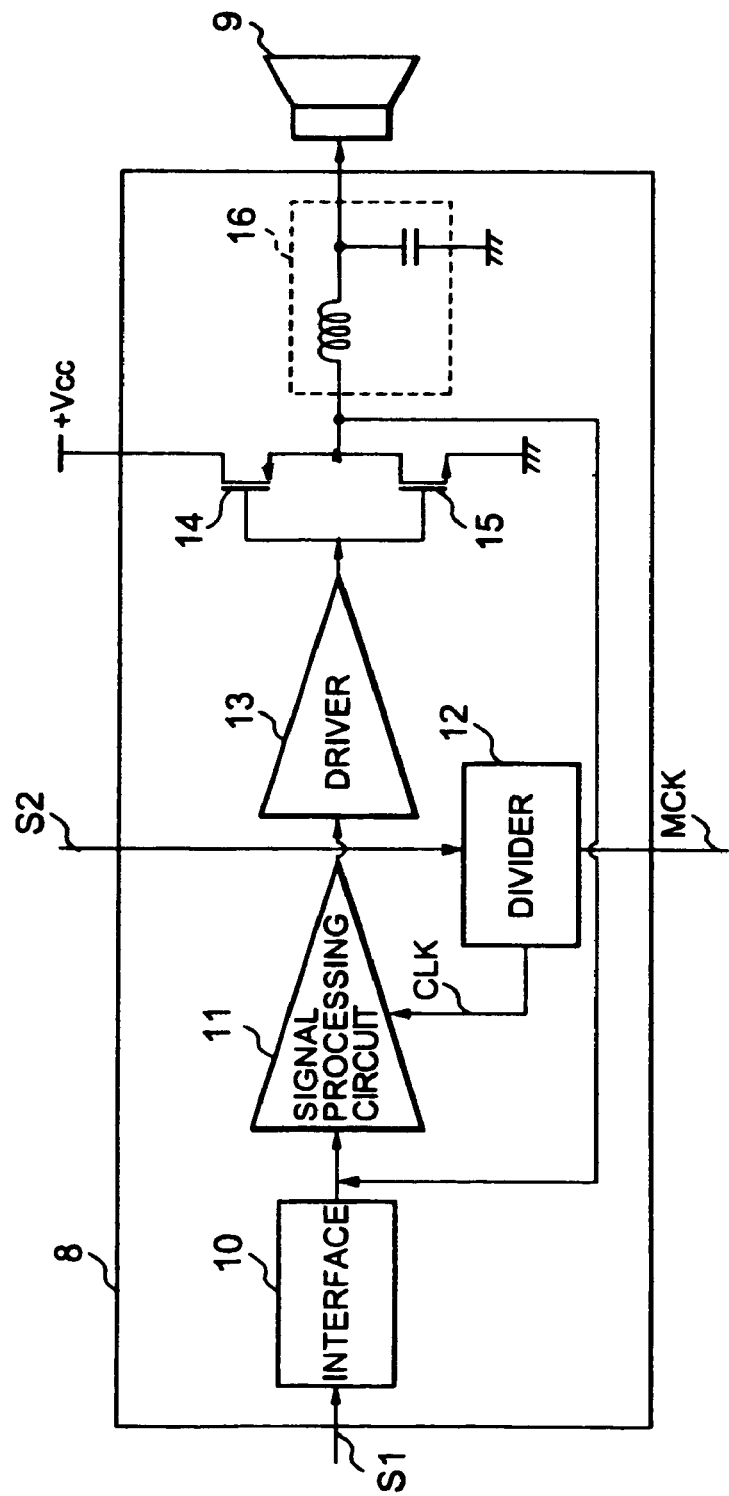
FIG. 3 is a block diagram showing a power amplifier and its peripheral structure of the car audio system of FIG. 2.

In the processing, a power amplifier unit 8 switches a switching frequency in accordance with a switching signal S2 output from the main CPU 3. Here, FIG. 3 precisely shows the power amplifier unit 8 together with its peripheral construction. In the power amplifier unit 8, an interface 10 outputs the audio signal S1 output from the output level adjuster unit 7 to a signal processing circuit 11.

A divider 12 divides a master clock MCK output from a not-shown oscillation circuit so as to output a clock CLK. In the car audio equipment 1, a channel clock obtained by dividing the master clock MCK is made synchronized with the first and second audio signals output from the source reproducing unit 2 and the broadcast receiver unit 4, respectively, so that the master clock MCK is set as a reference for operating the whole system. The divider 12 switches a dividing ratio in accordance with the switching signal S2 output from the main CPU 3 so as to switch the frequency of the clock CLK. The divider 12 switches the dividing ration by switching the number of steps of a flip-flop so that the clock CLK is switched between a first frequency f1 and a second frequency f2, the latter being twice as high as the first frequency. The power amplifier unit 8 switches the switching frequency according to the arrangement.

The signal processing circuit 11 processes the audio signal S1 input through the interface 10 in accordance with a pulse width modulation using the clock CLK output from the divider 12 as a reference, a 1-bit sigma delta modulation or the like, and generates the pulse width modulation signal whose pulse width changes in accordance with a signal level of the audio signal S1 so as to output it. A driver 13 complementarily performs on-off control electric field effect type transistors 14 and 15 in accordance with the pulse width modulation signal output from the signal processing circuit 11.

The electric field effect type transistors 14 and 15 are connected in series between a power supply +Vcc and the ground, and they are arranged to repeat on-off operation alternately under the control of the driver 13. A low pass filter 16 band-limits a drive signal output from the electric field effect type transistors 14 and 15 and outputs it to the speaker 9. According to the construction, the power amplifier unit 8 drives the speaker 9 in accordance with a drive signal output from the low pass filter 16. At this time, the switching of the frequency of the clock CLK in the divider 12 under the control of the main CPU 3 leads to the switching of the switching frequency in the power amplifier unit 8 under the control of main CPU 3.

An operating unit 17 has operation instruments including a button, a dial or the like, and notifies the main CPU 3 of user's operation through the operation instruments.

The main CPU 3 is a controller controlling movement of the whole car audio equipment 1 and operates in accordance with the notification from the operating unit 17 to control the broadcast receiver unit 4, the source reproducing unit 2 or the like and to provide the user with his/her desired music or the like. In this processing, the main CPU 3 loads from a memory a frequency of broadcast wave, which was recorded at the time of power-off, when a start of reception of the broadcast wave is instructed, so as to control the broadcast receiver unit 4 to receive the corresponding frequency.

Figure 1:
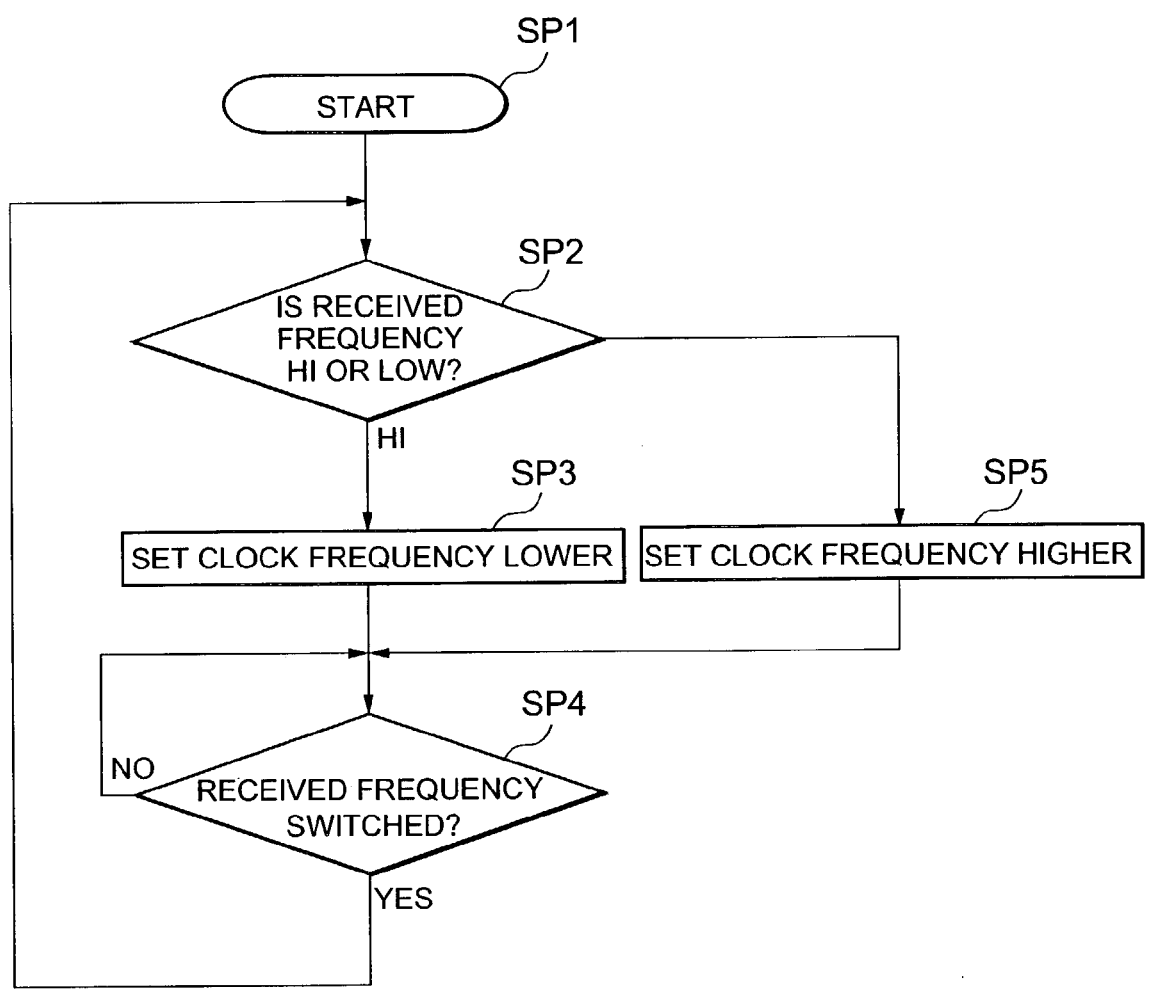
FIG. 1 is a flowchart showing a processing procedure in a main processing unit in a car audio system according to a first embodiment of the present invention.

Further, in a case where the main CPU 3 starts reception of a broadcast wave in the medium wave, the main CPU 3 switches a switching frequency of the power amplifier unit 8 in accordance with the receiving frequency by carrying out the processing steps shown in FIG. 1.

In other words, when the main CPU 3 starts the processing steps, it determines whether the frequency of the broadcast wave to be received is higher (HI) or lower (LOW) than a predetermined reference frequency in step SP2. The reference frequency is set to be approximately in between the frequencies f1 and f2 of the clock CLK switched by the divider. The reference frequency also satisfies a condition that, when operating the power amplifier unit 8 by switching the clock CLK, the electric field intensities due to spurious become substantially equal to each other.

In a case where the receiving frequency is higher than the reference frequency, the main CPU 3 outputs the switching signal S2 so as to set the frequency of the clock CLK to a lower frequency side in step SP3, and the process goes to step SP4.

On the other hand, in a case where the receiving frequency is lower than the reference frequency, the main CPU 3 outputs the switching signal S2 so as to set the frequency of the clock CLK to a lower frequency side in step SP5, and then, the process goes to step SP4. According to the operation, the main CPU 3 sets the switching frequency of the power amplifier unit 8 to be away from the received frequency.

In addition, after setting the switching frequency as described above, the main CPU 3 determines whether or not the receiving frequency has been switched in accordance with the selecting operation by the user in step SP4. If no, step SP4 is repeated, while, if yes, the process goes back to step SP2.

(1-2) Operation of the First Embodiment

In the above-described construction, in the car audio equipment 1 (FIG. 2), when an instruction to reproduce audio data recorded on a recording medium, such as a compact disc, a mini disc, a hard disk, a memory card, is made by the user through the operating unit 17, the source reproducing unit 2 starts operation under control of the main CPU 3 to reproduce the audio data on the recording medium so as to output the first audio signal. Further, the output first audio signal is input to the output level adjuster unit 7 through the input switch unit 6, and after being corrected with regard to its sound quality and volume, the pulse width modulation signal is generated in the power amplifier unit 8 in accordance with the first audio signal. Accordingly, in the car audio equipment 1, the final transistor is switched in accordance with the pulse width modulation signal so as to drive the speaker 9, and the user can enjoy music or the like recorded in various recoding media.

On the other hand, reception of the broadcast wave is instructed by a notification from the operating unit 17, the broadcast receiver unit 4 is activated to receive a broadcast wave in the medium wave or the FM broadcasting, and a second audio signal according to the received broadcast wave is input to the output level adjuster unit 7 through the input switch unit 6. Accordingly, in the car audio system 1, the second audio signal obtained through reception of the broadcast wave drives the speaker 9.

In the processing, in the car audio equipment 1, since the power amplifier unit 8 is the switching power amplifier circuit, a spurious occurs in the frequency range of several hundreds kHz to several MHz. In this regard, although there is no influence of such a spurious on listening of the first audio signal in a case of reproducing a recording medium or the like, there is indispensable influence on reception of the broadcast wave in a case of receiving the broadcast wave in the medium wave, and further, in some very extreme cases, the broadcast wave cannot be received.

On this account, in the car audio equipment 1, in a case of receiving the broadcast wave in the medium wave, the main CPU 3 judges the receiving frequency with reference to the predetermined reference frequency, and the switching frequency of the power amplifier unit 8 is switched to be away from the receiving frequency in accordance with the determination by the main CPU 3. According to the above arrangement, in the car audio system 1, the switching frequency of the power amplifier unit 8 is switched so as not to affect on the reception of the broadcast wave, and even in the case of having the switching power amplifier circuit, the user can surely listen to the desired program.

Figure 4:
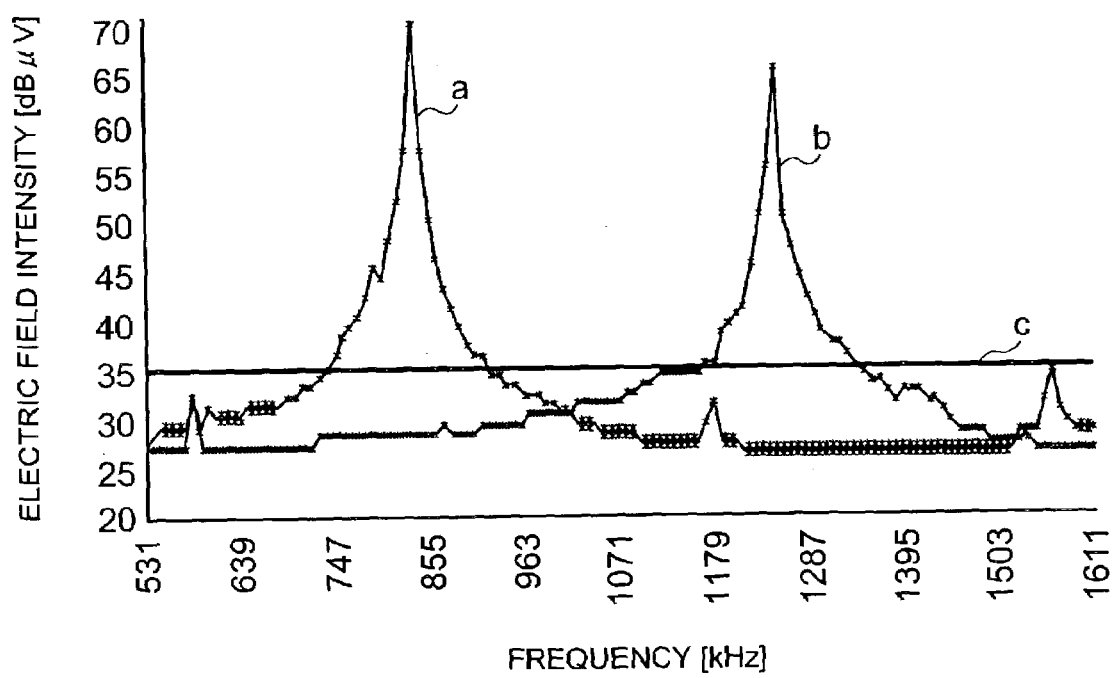
FIG. 4 is a view of characteristic curves showing measurement results of electric field intensity.

FIG. 4 is a figure of characteristic curves to show frequency distribution of spurious in a case of setting the switching frequency of the power amplifier unit 8 to be a frequency of 830 kHz (shown with reference code "a") and a case of setting it to be a frequency of 1.25 MHz (shown with reference code "b"). Usually, a practical electric field intensity receivable in the medium wave is sufficient to be 35 dBμV (shown with reference code "c"). Thus, in this case, the reference frequency is set at approximately 1 MHz, between the frequencies of 830 KHz and 1.25 MHz, and the switching frequency is switched so that the broadcast wave in the medium wave can be surely received in all frequency bands.

(1-3) Effect of the First Embodiment

According to the above construction, by switching the switching frequency of the power amplifier circuit in accordance with the receiving frequency, influence of the spurious can be avoided effectively, and thus, even in the case of having the switching power amplifier circuit, the user can surely listen to the desired program.

In specific, by switching the switching frequency to be away from the receiving frequency, the influence of the spurious can be surely avoided.

(2) Second Embodiment

Figure 5:
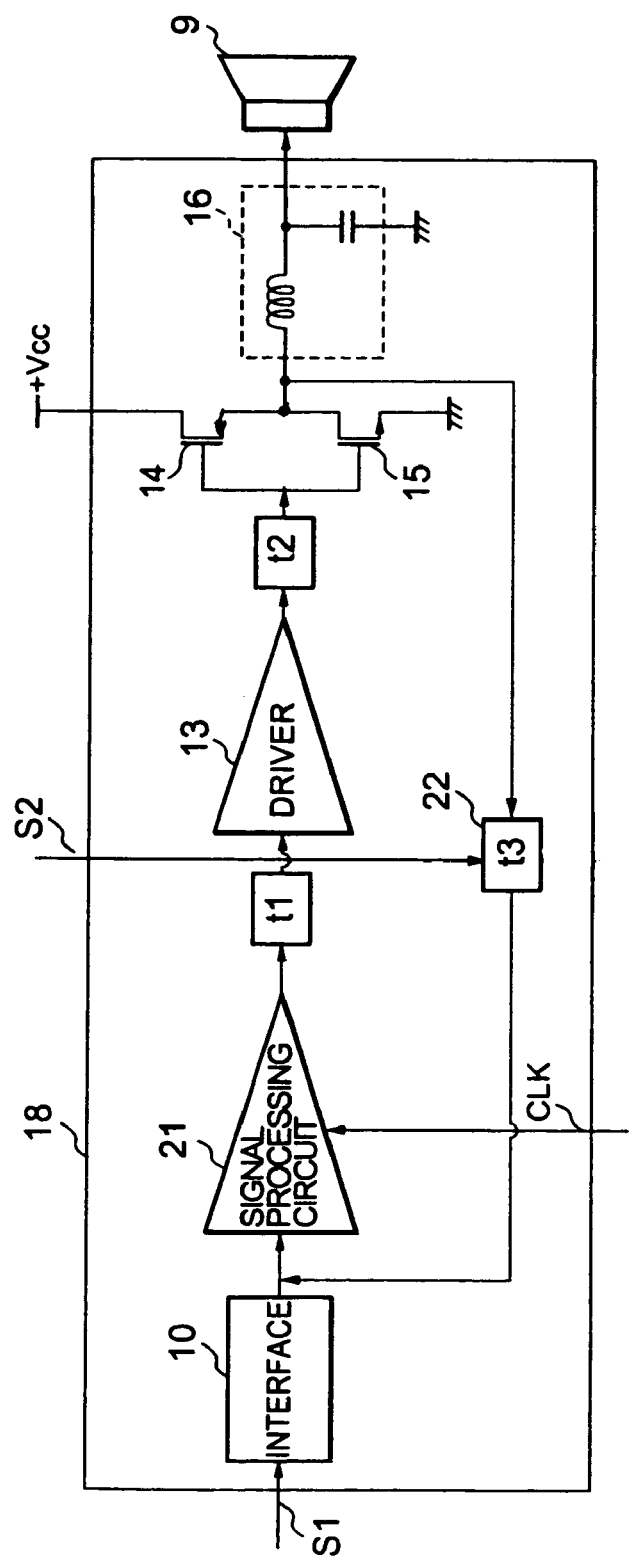
FIG. 5 is a block diagram showing a power amplifier and its peripheral structure of a car audio system according to a second embodiment of the present invention.

FIG. 5 is a block diagram showing a power amplifier unit applied to a car audio system according to a second embodiment of the present invention. The car audio equipment of the present embodiment is constituted to be the same as the car audio equipment of the first embodiment except in that it has a power amplifier unit with different structure and in that the main CPU 3 controls the equipment differently due to the difference in the structure of the power amplifier unit. On this account, the second embodiment will be described with reference to the constitution of the first embodiment appropriately.

In a power amplifier unit 18, after an audio signal S1 is input through an interface 10 identical to that in the power amplifier unit 8 described with regard to the first embodiment above, a signal processing circuit 21 generates a pulse width modulation signal and electric field effect type transistors 14 and 15 are on-off controlled using the pulse width modulation signal via a driver 13.

In the processing, the signal processing circuit 21 feeds back a drive signal of a speaker 9 obtained at a connection midpoint between the electric field effect type transistors 14 and 15 via a delay circuit 22. Then, the signal processing circuit 21 generates the pulse width modulation signal in accordance with a switching frequency F expressed by an equation $F=1/(t+t1+t2+t3)$. Here, "t" is a basic switching period of the power amplifier unit 18, and the time t1 is a delay time period required from the time the pulse width modulation signal is generated in the signal processing circuit 21 until it is supplied to the driver 13. In addition, the time t2 is a delay time period required until the electric field effect type transistors 14 and 15 are on-off controlled using the pulse width modulation signal input to the driver 13, and the time t3 is a delay time period required until the drive signal of the speaker 9 is fed back to the signal processing circuit 21.

When a switching signal S2 output from the main CPU 3 changes the delay time period in the delay circuit 22 and this changes the delay time period t3 required for feeding the drive signal of the speaker 9 back to the signal processing circuit 21, the power amplifier unit 18 can change the switching frequency F. According to the arrangement, in the present embodiment, the switching frequency is switched by controlling the delay time period in the power amplifier unit 18.

Figure 6:
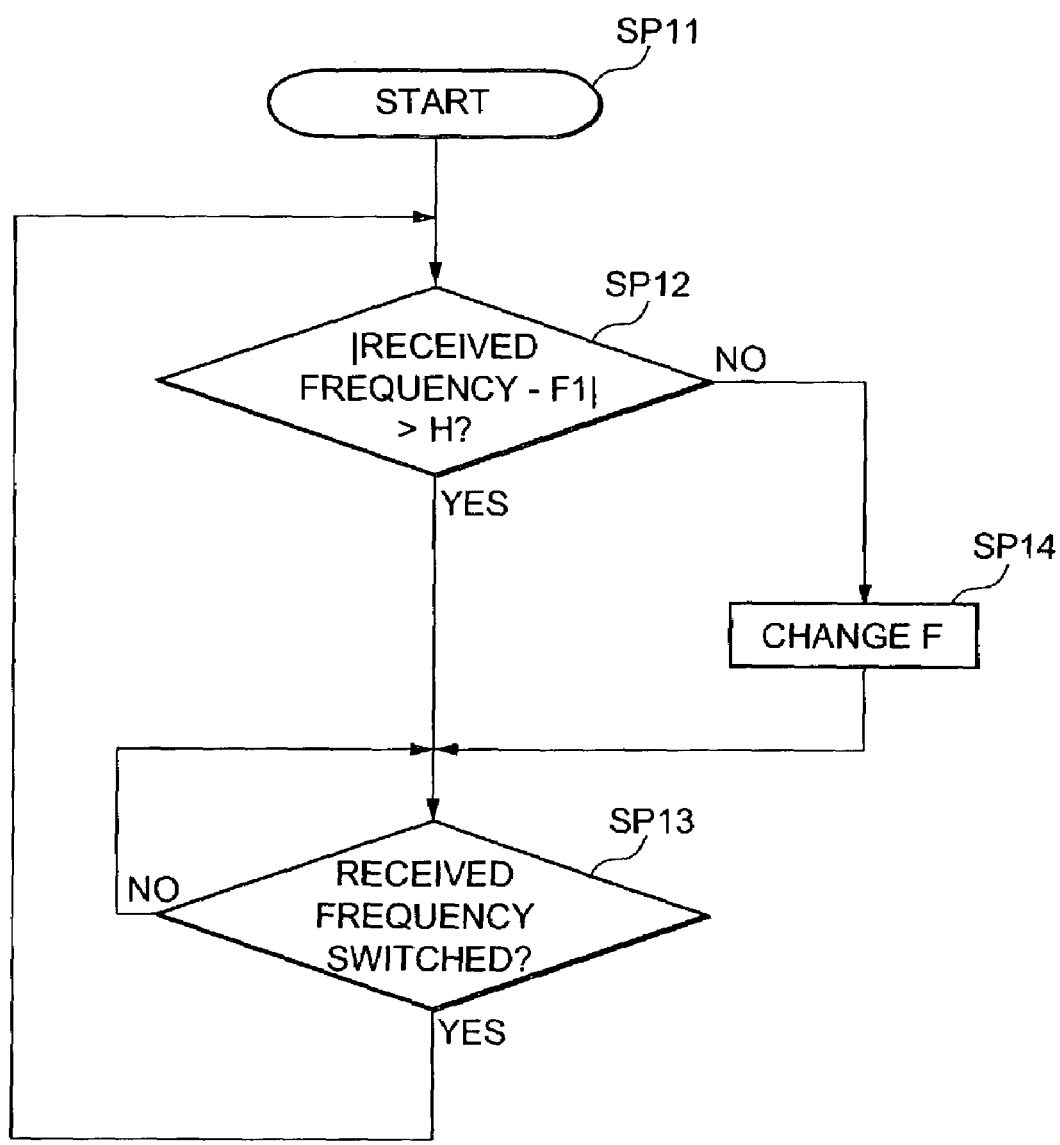
FIG. 6 is a flowchart showing a processing procedure in a main processing unit in the car audio system according to the second embodiment of the present invention.

FIG. 6 is a flowchart showing a processing procedure in a main CPU 3 according to the power amplifier unit 18. Once instructed by a user to receive a broadcast wave in the medium wave, the main CPU 3 judges whether a receiving frequency is away from the current switching frequency F by a predetermined frequency or more in step SP12. Practically, the main CPU 3 determines whether or not the receiving frequency is away from the switching frequency F by 10 kHz or more, in step SP12.

If yes in step SP12, the process goes to step SP13 without changing the switching frequency F at all. On the other hand, if no in step SP12, the process goes to step SP14 and the main CPU 3 varies the delay time period in the delay circuit 22 so as to have the switching frequency F be away from the receiving frequency by the predetermined frequency, and then, the process goes to step SP13.

According to the operation, the main CPU 3, after setting the switching frequency so as not to affect the reception of the broadcast wave, waits for switching of the receiving frequency by the user in step SP13, and if the receiving frequency is switched, the process goes back to step SP12.

As in the present embodiment, varying the switching frequency by varying the delay time period also realizes an effect similar to that obtained in the first embodiment.

(3) Other Embodiments

In the second embodiment, there has been described the case in which the switching frequency is switched by varying the delay time period in the feedback circuit, however, the present invention is not limited to the case. A similar effect can be obtained when the switching frequency is switched by varying the other delay time period t1 and/or t2.

In addition, in the embodiment described above, the case in which the switching frequency is switched when receiving the broadcast wave in the medium wave, however, the present invention is not limited to the case. If necessary, the switching frequency may also be switched when receiving a short-wave broadcast wave, for example.

In the above embodiment, the case of switching the switching frequency when amplifying the audio signal of the broadcast wave in the medium wave in the power amplifier circuit, however, the present invention is not limited to the case. The present invention may be widely applied to cases of receiving middle-wave broadcast waves, as in a case of enjoying music recorded in a CD while recording an audio signal of the middle-wave broadcast wave, for example.

In addition, in the above embodiment, the case in which the present invention is applied to car audio equipment being an on-vehicle device, however, the present invention is not limited to the case. For example, the present invention may be widely applied to audio equipment mounted on various movable bodies such as a train and a ship, or further, to home-use audio equipment or the like.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. Audio equipment comprising:
    a power amplifier circuit for amplifying an audio signal by switching and including a signal processing circuit processing an input signal obtained from a radio receiver, a pair of switching transistors whose switching is controlled by an output of the signal processing circuit, a variable time delay unit, and a feedback line from the switching transistors to the variable time delay unit and from the variable time delay unit to an input of said signal processing circuit; and
    a controller for controlling a switching frequency of said power amplifier circuit,
    wherein said controller varies the switching frequency of said power amplifier circuit in accordance with a receiving frequency when the radio receiver receives a medium-wave broadcast wave by varying a delay time period of said variable time delay unit connected in said feedback line.

2. The audio equipment according to claim 1, wherein said controller varies said switching frequency to deviate from said receiving frequency.

3. A method of controlling audio equipment that amplifies an audio signal from a radio receiver using a switching power amplifier circuit having a signal processor and a pair of switching transistors, said method comprising the steps of:
    inserting a feedback line from the switching transistors to a variable time delay unit and from the variable time delay unit to an input of the signal processor;
    determining that a receiving frequency of a medium-wave broadcast wave received by the radio receiver deviates from a switching frequency of said switching power amplifier circuit by a predetermined value; and
    varying the switching frequency of said switching power amplifier circuit when the receiving frequency does not deviate from the switching frequency by the predetermined value.

* * * * *